United States Patent [19]
Timperi et al.

[11] Patent Number: 6,041,683
[45] Date of Patent: *Mar. 28, 2000

[54] SYSTEM FOR ADJUSTING THE ROTATION SPEED OF A CROSS-CUTTING SAW OF A TREE HANDLING MACHINE, ESPECIALLY GRAPPLE HARVESTER

[75] Inventors: Arto Timperi, Tampere, Finland; Anders Tågmark; Lennart Carlsson, both of Filipstad, Sweden

[73] Assignee: Plustech Oy, Tampere, Finland

[ * ] Notice: This patent issued on a continued prosecution application filed under 37 CFR 1.53(d), and is subject to the twenty year patent term provisions of 35 U.S.C. 154(a)(2).

[21] Appl. No.: 08/686,927

[22] Filed: Jul. 16, 1996

[30] Foreign Application Priority Data

Jul. 18, 1995 [FI] Finland ................... 953463

[51] Int. Cl.⁷ ............... B26D 5/04; B27B 33/14
[52] U.S. Cl. ................. 83/76; 83/74; 83/639.1; 83/796; 83/801; 144/34.1; 144/356
[58] Field of Search .............. 83/789, 796, 801, 83/646, 639.1, 76, 74, 72; 144/34.1, 356; 91/450, 459, 448, 512, 519, 517

[56] References Cited

U.S. PATENT DOCUMENTS

| | | | |
|---|---|---|---|
| 3,715,946 | 2/1973 | Kaltenbach | 83/72 |
| 3,738,208 | 6/1973 | Hartzell | 83/76 X |
| 3,864,951 | 2/1975 | Gulyaev et al. | 72/12.5 |
| 4,016,787 | 4/1977 | Sugimoto | 83/72 X |
| 4,083,291 | 4/1978 | Larsson | 91/517 |
| 4,091,698 | 5/1978 | Obear et al. | 83/74 X |
| 4,170,915 | 10/1979 | Sato | 83/76 X |
| 4,266,276 | 5/1981 | Hayashi et al. | 83/76 X |
| 4,357,848 | 11/1982 | Sakurai et al. | 83/801 X |
| 4,358,974 | 11/1982 | Sakurai | 83/74 X |
| 4,432,260 | 2/1984 | Sarurai et al. | 83/13 |
| 4,437,367 | 3/1984 | Hauser | 83/13 |
| 4,440,051 | 4/1984 | Aykut | 83/72 |
| 4,620,465 | 11/1986 | Taguchi | 83/74 |
| 4,625,603 | 12/1986 | Vanden Brink | 83/74 X |
| 4,667,551 | 5/1987 | Kuromaru et al. | 83/72 X |
| 4,691,601 | 9/1987 | Peddinghaus | 83/56 |
| 4,722,258 | 2/1988 | Johnson | 83/796 X |
| 4,809,573 | 3/1989 | Welch | 83/72 X |
| 4,901,612 | 2/1990 | Harris | 83/796 X |
| 4,942,795 | 7/1990 | Linke et al. | 83/72 |
| 5,043,907 | 8/1991 | Richards | 83/796 X |
| 5,115,403 | 5/1992 | Yoneda et al. | 83/72 X |
| 5,257,567 | 11/1993 | Walker et al. | 83/74 X |
| 5,784,883 | 7/1998 | Ohkura et al. | 60/327 |

FOREIGN PATENT DOCUMENTS 0761227  9/1980  U.S.S.R. ................... 83/72

*Primary Examiner*—Rinaldi I. Rada
*Assistant Examiner*—Boyer Ashley
*Attorney, Agent, or Firm*—Pollock, Vande Sande & Amernick

[57] ABSTRACT

An apparatus for adjusting the rotation speed of a cross-cutting saw of a tree handling machine, especially grapple harvester is provided. The apparatus is arranged to control a hydraulic cylinder connected to the guide bar of the cross-cutting saw in a power transmitting way. A line communicating with the source of pressure medium and having an adjusting unit for adjusting the pressure of the cylinder is connected to the hydraulic cylinder. The system further includes a computing unit, and a rotation speed sensor in conjunction with the cross-cutting saw for measuring the rotational speed of the cross-cutting saw. The rotational speed sensor has a data transmitting connection with the computing unit arranged to control the adjusting unit according to the measured speed.

16 Claims, 2 Drawing Sheets

SYSTEM FOR ADJUSTING THE ROTATION SPEED OF A CROSS-CUTTING SAW OF A TREE HANDLING MACHINE, ESPECIALLY GRAPPLE HARVESTER

FIELD OF THE INVENTION

The invention relates to a system for adjusting the rotational speed of a cross-cutting saw of a tree handling machine, especially grapple harvester. This system is arranged to control an actuator, such as a hydraulic cylinder, operated by pressure medium and connected to the cross-cutting saw in a power transmitting way, to which actuator there is connected a line communicating with the source of pressure medium and having adjusting means for adjusting the pressure of the actuator.

BACKGROUND OF THE INVENTION

In mobile tree handling machines capable of moving in terrain, usually a cross-cutting saw is used, in which a chain-formed blade encircles the guide bar. The chain is moved by a motor which is in a power transmitting connection with it, and is usually controlled by pressure medium, such as hydraulic oil. To perform the cross-cutting the guide bar is turned against a tree by means of a cylinder, which is also controlled by pressure medium. In prior art cross-cutting saws of tree handling machines, the feeding speed of the guide bar and the feeding power are usually set to be constant. Thus, the feeding speed and the feeding power has to be adjusted so low that the cross-cutting saw can also saw trees with a high sawing resistance, for example when sawing thick trees. However, at the beginning of the sawing and when sawing thin trees, the feeding speed is too slow, which in turn retards the cutting of tree. In the final phase of the sawing the sawing speed remains slow, which easily causes crack damage in the tree.

At present, cross-cutting saws are known in which it the feeding pressure of pressure medium passing to the motor of the saw is measured, alkyd an attempt to keep it constant, wherein the rotational speed of the saw is kept substantially constant. In such systems, considerable and sudden stress may be directed to the saw if there exists significant variations in sawing resistance when cutting tree. This may even damage the cross-cutting saw. Prior art systems have poor efficiency, because the adjusting is performed through loss adjustment implemented by choking.

SUMMARY OF THE INVENTION

The object of the present invention is to eliminate the above mentioned drawbacks and to improve the state of art in the field. To achieve this object, in the present invention the adjusting system comprises a computing means, and a rotational speed sensor in conjunction with the cross-cutting saw for measuring the rotational speed of the cross-cutting saw, which rotational speed sensor is in data transmitting connection with the computing means arranged to control the adjusting means according to the measurement.

The invention is based on the idea of measuring the rotational speed of the cross-cutting saw and according to the measurement adjusting the feeding power of the guide bar or other structure that supports the sawing blade, whereby the rotational speed is kept substantially constant.

The invention provides significant advantages. When using an adjusting system in accordance with the invention, the rotational speed of the cross-cutting saw stays substantially constant, allowing the cutting of trees to be performed faster than by means of prior art saws using constant rotational speed, because feeding speed and feeding power need not be adjusted to be constant according to the thickest tree giving the highest resistance. The system of the invention also takes well into account changes in the structure of the trees to be cut off, such as variations in humidity, changes in hardness and temperature and variations in sharpness of the cross-cutting saw. Further, the danger of damaging the cross-cutting saw is smaller than when using prior art systems, because the movement of the guide bar is controlled by adjusting feeding power and speed according to existing conditions.

The invention will be described in the following more closely by reference to the accompanying drawings, wherein

DETAILED DESCRIPTION OF PREFERRED EMBODIMENT(S)

Figure 1:
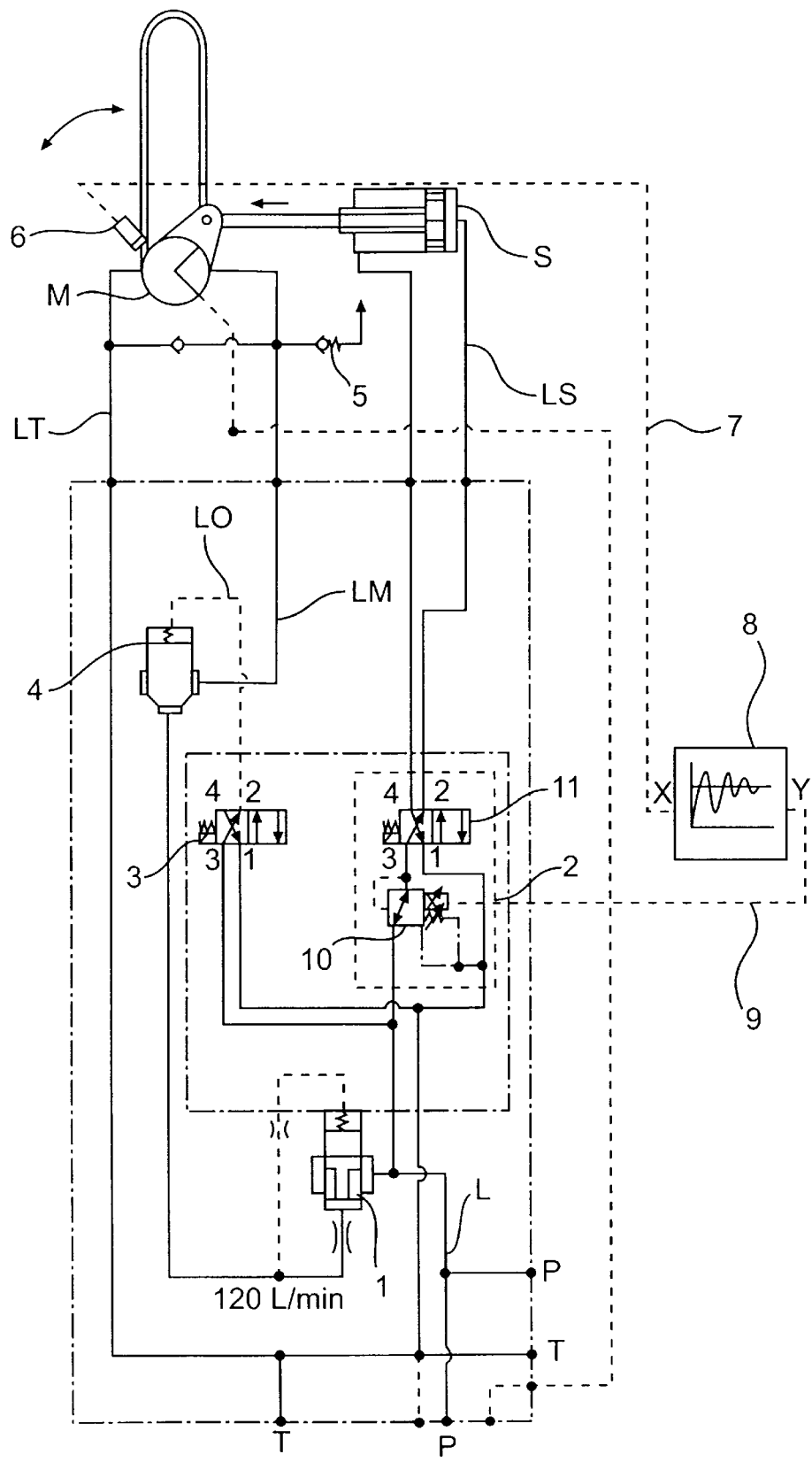
FIG. 1 shows a system for adjusting the rotation speed of a cross-cutting saw in accordance with inventions.
Figure 2:
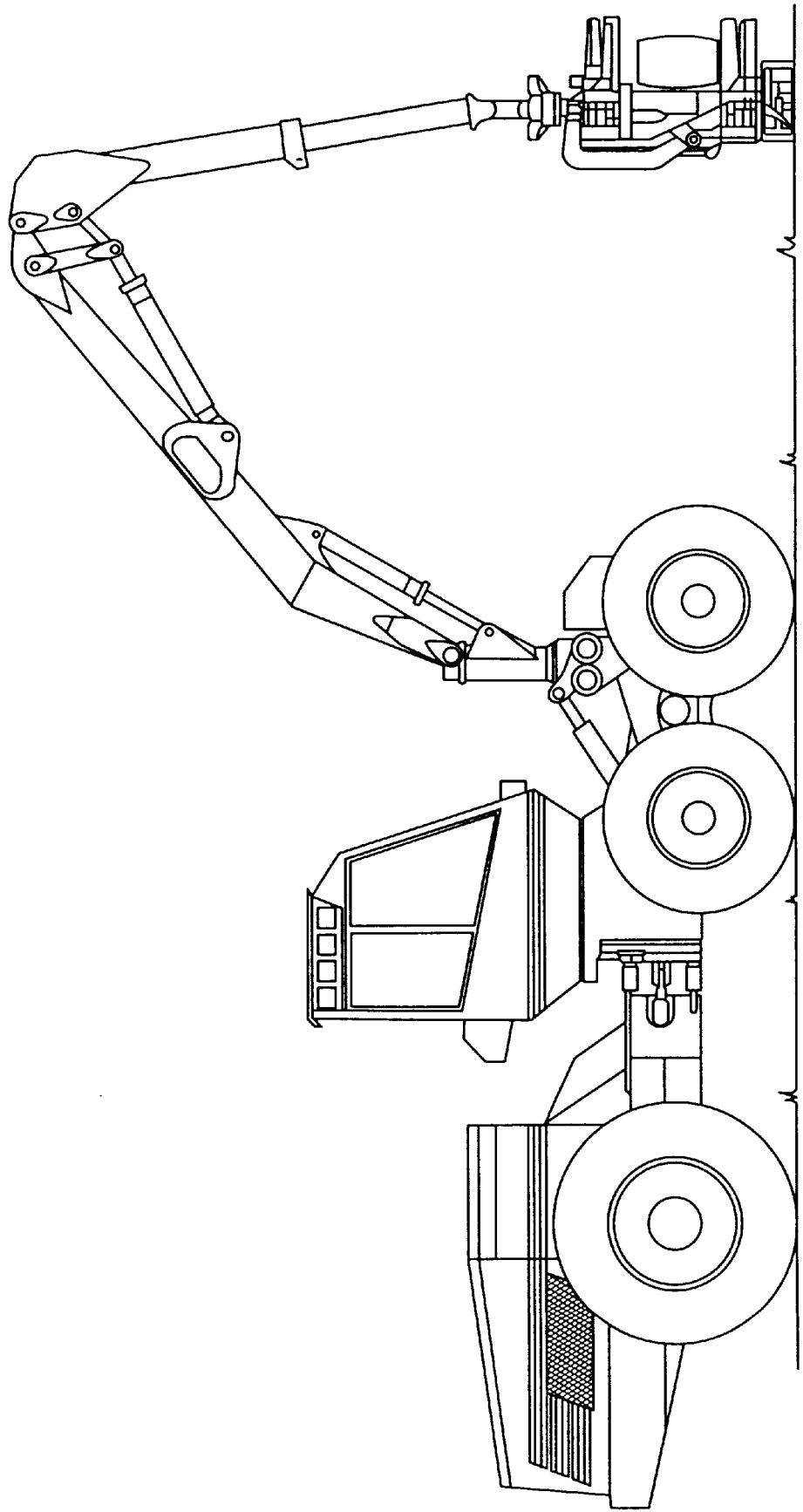
FIG. 2 shows a tree handling machine.

FIG. 1 illustrates an adjusting system of the invention as a hydraulic diagram, showing the most important components of the system. The hydraulic components of the adjusting system are placed in a multi-functional head, i.e. a felling head of the tree handling machine, which multi-function head is at the end of a pivotable boom of the tree handling machine and comprises in addition to the cross-cutting saw and its actuators also means for feeding and delimbing tree trunks. The adjusting system comprises a line L connected to pressure medium source, such as a hydraulic oil pump P. The line L passes to a restriction valve 1, which is a so-called pressure balance. The restriction valve 1 limits the amount of pressure medium flow to a motor M in a manner that the highest allowed rotational speed of the motor is not exceeded in any situation. Along the line L pressure medium is led also to adjusting means 2, which control the movement of a guide bar of the cross-cutting saw or the like structure supporting the cross-cutting blade. Pressure medium is led from the line L also via a starting valve 3 to a control valve 4 of the motor M along a control line LO, wherein pressure medium opens the control valve 4. When the control valve 4 is open pressure medium is led via the restriction valve 1 through the control valve 4 to the motor M along the feed line LM of the motor, whereupon the motor M starts to rotate. From the motor M pressure medium is led to a pressure medium tank T along a return line LT. Further, in connection with the motor M there is a check valve 5, which lets pressure medium to pass through in case pressure in the return line LT exceeds the pre-set value. The connection to pressure is shown as P in FIG. 1.

The starting valve 3 of the motor M is controlled in a known manner. In the drawing the starting valve 3 is shown in a position in which the control of the starting valve 3 is switched off and the motor M is rotating. When the control of the starting valve 3 is switched on, the starting valve 3 is activated and the right-hand section is shifted into communication with the lines. Thus, the control of the control valve 4 ceases to function and the control valve 4 closes stopping the motor M at the same time. Pressure medium is led from the control line LO of the control valve 4 via the starting valve 3 to the pressure medium tank T.

Adjusting of the guide bar of the cross-cutting saw is implemented in the adjusting system of the invention in a manner that in conjunction with the cross-cutting saw, in this situation in conjunction with its motor M, there is arranged a rotational speed sensor 6, which may be of a known type, measuring the rotational speed of the motor M, as such. Rotational speed sensor 6 can be advantageously an impulse indicator or a speed counter (tachometer) giving a certain pulse number for each revolution of the motor. Rotational speed sensor 6 is connected in a data transmitting way by means of a data transmission bus 7 to a computing means 8, which comprises an electronic control circuit. The computing means 8 counts the number of pulses coming from the rotational speed sensor 6, preferably per a pre-set time unit, based on which the computing means 8 calculates the rotational speed of the motor. The computing means 8 compares the calculated rotational speed with the pre-set value. According to the comparison the computing means 8 controls via a control line 9 a guide bar adjusting valve 10 belonging to the adjusting means 2. The guide bar adjusting valve 10, a pressure control valve, adjusts the medium flow directed along a cylinder line LS to the cylinder S of the guide bar. If the rotational speed calculated according to the measurement is lower than the pre-set value, the computing means 8 adjusts the adjusting valve 10 of the guide bar in a manner that the pressure in the cylinder line LS decreases, also causing the feeding power of the guide bar to decrease. When the revolutions of the saw motor increase, the control circuit adjusts again a higher pressure by means of the adjusting valve 10. In the computing means 8 various calculating algorithms can be used, wherein the response time can be decreased or increased according to requirements, which is known as such. The computing means 8 can be placed in the control automation means of the tree handling machine. The adjusting valve 10 in the cylinder line LS is a proportional valve, a pressure valve known as such, whose output pressure can be adjusted electrically through the control line 9. The input signal to the computing means is designated X and the output signal from the computing means is designated Y in FIG 1.

The rotation speed of the motor M of the saw can never be higher than what is restricted by the restriction valve 1 limiting the maximum amount of pressure medium directed to the line LM. The control circuit always tends to give full number of revolutions to the motor, governed by the terms of control.

The feeding direction of the guide bar is controlled by means of its directional control valve 11 belonging to the adjusting means 2, and it is shown in the drawing in a tree cutting position, that is the guide bar is fed against a tree in order to cut it. When the tree is cut, the control system of the cross-cutting saw controls the directional control valve 11 of the guide bar, the guide bar being transferred, effected by pressure medium, back to its starting position. The pressure medium in the cylinder, on the side of the cylinder line LS, is led to pressure medium tank T.

The invention is not restricted only to the above described embodiment but it can be modified within the scope of the accompanying claims. It can, for example, be used in connection with other types of cross-cutting saws than chain saws, and it is thus common to all the saws where the cylinder acts on a structure moving in relation to the tree trunk and supporting the cutting saw blade in order to feed the saw in accordance with the invention during cross-cutting. Furthermore, the placement of the rotational speed sensor is not limited but it can be situated in any suitable place where the rotational speed of the saw can be measured, for example in a manner that it measures the speed in question directly from the saw blade.

We claim:

1. An apparatus for adjusting feeding power of a cross-cutting saw of a mobile tree handling machine capable of moving in terrain, said apparatus comprising, an actuator connected to transmit power to said saw;

a line connected between said actuator and a source of pressure medium for creating a pressure in said actuator and a feeding power of said saw from said actuator, said line comprising a means for adjusting the pressure in said actuator;

a hydraulic motor rotating the cross-cutting saw at a rotational speed, a rotational speed sensor arranged to measure the rotational speed of said saw directly from said hydraulic motor;

a computing means for comparing measured rotational speed of said saw with a pre-set value and for controlling said means for adjusting so that when said measured rotational speed exceeds said pre-set value said pressure in said actuator and said feeding power increases and when said measured rotational speed decreases below said pre-set value said pressure in said actuator and said feeding power decreases, whereby said rotational speed of said saw is maintained substantially constant; and a transmitting connection communication with said rotational speed sensor and said computing means.

2. The apparatus of claim 1, wherein the means for adjusting comprise proportional valve.

3. The apparatus of claim 1, wherein the computing means is an electronic computing means.

4. The apparatus of claim 1, wherein the tree handling machine is a grapple harvester.

5. The apparatus of claim 4, wherein the computing means is an electronic computing means.

6. The apparatus of claim 1, wherein the actuator is a hydraulic cylinder.

7. The apparatus of claim 6, wherein the tree handling machine is a grapple harvester.

8. The apparatus of claim 7, wherein the computing means is an electronic computing means.

9. An apparatus for adjusting feeding power of a cross-cutting saw having a saw blade and included in a mobile tree handling machine capable of moving in terrain, said apparatus comprising, an actuator connected to transmit power to said saw;

a line connected between said actuator and a source of pressure medium for creating a pressure in said actuator and a feeding power of said saw from said actuator, said line comprising a means for adjusting the pressure in said actuator;

a hydraulic motor rotating the cross-cutting saw at a rotational speed, a rotational speed sensor arranged to measure the rotational speed of said saw directly from saw blade;

a computing means for comparing measured rotational speed of said saw with a pre-set value and for controlling said means for adjusting so that when said measured rotational speed exceeds said pre-set value said pressure in said actuator and said feeding power increases and when said measured rotational speed decreases below said pre-set value said pressure in said actuator and said feeding power decreases, whereby said rotational speed of said saw is maintained substantially constant; and a transmitting connection communication with said rotational speed sensor and said computing means.

10. The apparatus of claim 9, wherein the means for adjusting comprise proportional valve.

11. The apparatus of claim 9, wherein the computing means is an electronic computing means.

12. The apparatus of claim 9, wherein the computing means is an electronic computing means.

13. The apparatus of claim 9, wherein the actuator is a hydraulic cylinder.

14. The apparatus of claim 13, wherein the tree handling machine is a grapple harvester.

15. The apparatus of claim 9, wherein the tree handling machine is a grapple harvester.

16. The apparatus of claim 15, wherein the computing means is an electronic computing means.

\* \* \* \* \*